April 21, 1959     F. J. GORZELANY ET AL     2,883,127
TURN CONTROL FOR AUTOMATIC PILOT SYSTEMS
Filed June 5, 1953
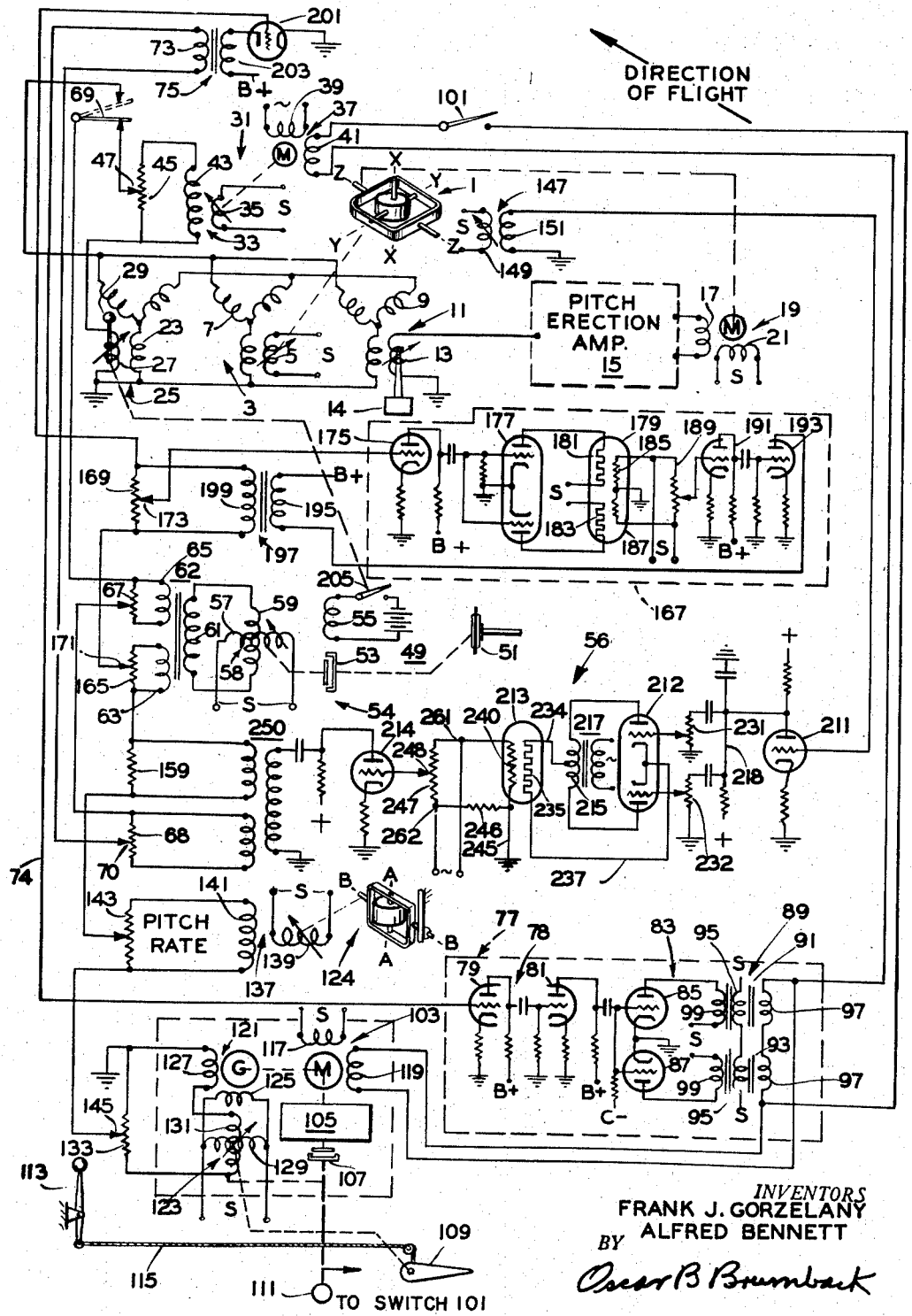
INVENTORS
FRANK J. GORZELANY
ALFRED BENNETT
BY Oscar B. Brumback
ATTORNEY

United States Patent Office 2,883,127
Patented Apr. 21, 1959

2,883,127

TURN CONTROL FOR AUTOMATIC PILOT SYSTEMS

Frank J. Gorzelany, Passaic, N.J., and Alfred Bennett, Bronx, N.Y., assignors to Bendix Aviation Corporation, Teterboro, N.J., a corporation of Delaware Application June 5, 1953, Serial No. 359,778

10 Claims. (Cl. 244—77)

This invention relates generally to control systems and more particularly to an aircraft control system for automatically increasing the pitch attitude of the aircraft during turns.

A loss in vertical lift occurs when an aircraft is banked to make a turn. Compensation may be made for this loss of lift by changing the pitch attitude of the aircraft to increase the angle of attack and develop a greater lift to maintain the craft at a level altitude. The required change in pitch attitude differs for left and right turns; the tendency to lose altitude being greater for a turn of the craft to the left than in a turn to the right because of the gyroscopic effect of the propellers rotating in a clockwise direction.

An object of the present invention, therefore, is to provide a novel device for keeping an aircraft at a constant level as it makes a turn.

Another object is to provide a novel means for imparting an "up-elevator" action to the elevator surface of an aircraft as the craft turns.

A further object is to provide a novel means for applying an "up-elevator" action to an aircraft as it turns in which the "up-elevator" action may be adjusted for turns to the right and left.

A still further object is to provide a novel means for developing an output which has a fixed phase relationship from an input of reversible phase.

The present invention contemplates a novel arrangement for increasing the pitch attitude of an aircraft wherein a reference device develops a signal corresponding in phase to a right or left turn, a detector recognizes the direction of turning by the phase of the signal and develops a corresponding output, and a thermal device responsive to the output develops a control effect to operate an elevator servomotor in a direction to increase the angle of attack of the craft regardless of the direction of turning.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not to be construed as defining the limits of the invention.

In the single sheet of drawing, the single figure is a schematic wiring diagram for an automatic pilot system constructed according to the invention.

Referring now to the drawings, the novel constant altitude control system of the present invention is shown as incorporated in the pitch control channel of an automatic pilot system for an aircraft. This pitch channel may be generally similar to that disclosed in copending application Serial No. 217,988, filed March 28, 1952, by J. C. Owen and assigned to the assignee of the present invention.

In modern aircraft, the leads conducting the signals from a series of signal developing devices may be of substantial length. Accordingly, the value of the impedance of the lead at one end may be great relative to ground at the other end. Also, the leads may pass near other leads or electrical apparatus and may inductively or capacitively pick up spurious signal voltages, known as noise signals, from such other electrical equipment. The possibility arises, therefore, that noise signals may obscure the signal output of some of the signal generators.

To obviate the foregoing possibility, the impedance value of the signal chain relative to ground is minimized by the provision of two substantially independent signal chains: a displacement signal chain which conducts the signals from the reference device to the servomotor, and a rate signal chain which conducts the signals through a rate-filter circuit before they are applied to the servomotor. The signals of the two signal chains are combined by way of an isolation tube and a mixing transformer and applied to the elevator servomotor.

In the displacement signal chain, signals from an attitude gyroscope 1, a manual controller 25, a pitch synchronizer 31, an altitude device 54, and the novel "up-elevator" device 56 are algebraically combined and applied to a mixing transformer 75. In the rate signal chain, signals from a rate generator 121, a follow-up device 123, a pitch rate gyro 124, the altitude device 54, and the novel "up-elevator" device 56 are algebraically combined and applied first to a rate circuit 167, then to an isolation amplifier 201 and finally to the mixing transformer 75.

Referring now to the reference instruments, vertical gyroscope 1 provides the reference signals for the attitude of the craft about its pitch and roll axes. The spin axis X—X of the gyro is normally positioned vertically by a suitable erection system and is mounted for rotation about two mutually perpendicular axes Y—Y and Z—Z; axis Y—Y being parallel to the pitch axis of the craft, and axis Z—Z being parallel to the roll axis. Inductive devices, mechanically connected to the axes to the gyroscope, develop the attitude signals.

The pitch attitude signals from inductive device 3 are supplied to a gyro erection system and to the displacement signal chain. Displacement of the craft about its pitch axis causes rotor winding 5 of inductive device 3 to be rotated with respect to stator winding 7, developing a signal which corresponds to the pitch attitude of the craft in stator 7. This signal is transmitted to stators 9 and 23; stator winding 7 being connected in parallel with the stator winding 9 of an inductive device 11 in the erection system for gyro 1 and with stator winding 23 of an inductive device 25 in the displacement signal chain.

When the two-pole single-phase wound rotor 5 of inductive signal transmitter 3 is excited by an alternating current, induction takes place between rotor 5 and the three-phase Y-connected wound stator 7 and the voltage induced in any one of the three stator legs differs from the voltage induced in the other two. A relative turning of rotor 5 and stator 7 immediately changes the voltage in each leg although the sum of these voltages remains constant. These voltages develop in stator 7 a resulting field which is transmitted to receivers 11 and 25.

The stator windings 9 and 23 of inductive devices 11 and 25 are connected in parallel with stator winding 7 so that the resulting field of stator 7 is reproduced in receiving stators 11 and 23. The angular displacement of this field in stators 11 and 23 corresponds to or follows the angular displacement of the rotor 5 and shifts whenever any voltage change occurs in the legs of stator 7.

Rotors 13 and 27 of inductive devices 11 and 25 are not externally excited. As long as rotors 13 and 27 lie in a null position where their poles are at right angles to the field of the stator, no signal is induced in the rotors. Should the position of a stator field or a rotor winding be shifted, the rotor will no longer be in a null position and a corresponding electrical impulse or signal will be developed in the rotor winding. Accordingly, an electrical signal will develop at rotors 13 and 27 whenever the pitch attitude of the craft changes; the signal produced by departure of rotor 5 from a null position in a clockwise direction being opposite in phase to that produced by the departure in a counterclockwise direction.

Inductive device 11 is the signal developing device for the erection system of vertical gyro 1. Its stator winding 9 receives the attitude signal from vertical gyro 1 and its rotor winding 13 is displaceable by a pendulum 14. The error signal which develops when the rotors of inductive devices 3 and 11 are not in identical positions is applied to a pitch erection amplifier 15.

Amplifier 15 may include a multivibrator and may be of the type described in application Serial No. 102,671, now Patent No. 2,577,912, filed July 1, 1949, by Corles M. Perkins and Alan M. MacCallum and assigned to the assigne of the present invention. Its output in the form of pulsed signals energizes the variable phase winding 17 of a two phase reversible erection motor 19 whose fixed phase winding 21 is continuously energized by an alternating current source. Because of the precessional characteristics of a gyro, the erection motor is placed ninety degrees away from the axis which it erects. Accordingly, motor 19 exerts a torque on gyroscope 1 about the bank axis to precess the gyroscope to vertical position about the pitch axis.

Turning now to the reference devices in the displacement signal for the elevators, the signal developed in stator 7 of inductive device 3 is reproduced in stator winding 23 of inductive device 25. As long as rotor winding 27 is in its null position relative to stator winding 23, only the attitude signal due to the displacement of rotor 5 of inductive device 3 is developed in rotor 27. However, a displacement of rotor 27 relative to stator 23 also adds a signal corresponding to its displacement.

Rotor winding 27 of inductive device 25 is displaced relative to stator 23 by the action of a manual controller 29. This controller may be generally of the type described in U.S. Patent No. 2,553,280 issued May 15, 1951, to F. H. S. Rossire. When the human pilot wishes to change the attitude of the craft, he moves controller 29, displacing rotor winding 27 of inductive device 25 relative to its stator 23. This adds a further signal to that received from stator 7 of attitude device 3.

Before the automatic pilot system is engaged with the control surfaces, pitch synchronizer 31 synchronizes the automatic pilot system with the pitch attitude of the craft. This synchronizer is comprised of an inductive device 33 and an induction motor 37. The fixed phase winding 39 of motor 37 is constantly energized by an alternating current source and its variable phase winding 41 energized by the output of a servoamplifier 77. Through a suitable mechanical connection, motor 37 rotates the rotor winding 35 of inductive device 33 relative to its stator winding 43 to impress a signal across a potentiometer 45.

Since various conditions such as up-drafts, downdrafts, and change in throttle setting may change the altitude of the craft without changing its attitude, a barometric altitude device 49 is provided to develop altitude reference signals. This may be of the type described in U.S. Patent No. 2,512,902, issued June 27, 1950, to F. H. S. Rossire wherein a pressure sensitive aneroid 51, through a clutch 53 which is operated by a solenoid 55, actuates the spring centered rotor winding 57 of an inductive device 58 to develop a signal in stator winding 59 upon a change in altitude. This signal is applied to the primary winding 61 of a coupling transformer 62 having two secondary windings 63 and 65, the signal being impressed across potentiometers 67 and 165.

To form the displacement signal chain, one end of rotor 27 of manual controller 29 is grounded and the other end connected to potentiometer 45 whose wiper 47 is connected through switch 69 to potentiometer 65 whose wiper 67 is connected to a potentiometer 68 receiving the signal of the novel "up-elevator" system 56 later to be described. The wiper 70 of potentiometer 68 is connected to the secondary winding 73 of mixing transformer 75.

Thus, displacement signals from the attitude gyroscope 1, manual controller 29, pitch synchronizer 31, altitude device 54, and the novel "up-elevator" system 56 are connected in series and algebraically combined for application by way of lead 74 to servoamplifier 77.

Servoamplifier 77 is comprised generally of a preamplifier 78, a discriminator 83 and a magnetic amplifier 89. The signals applied to the servoamplifier are amplified in two stages by the twin triodes 79 and 81 which constitute preamplifier 78 and impressed on the grids of tubes 85 and 87 which constitute discriminator 83. Here the phase of the signal voltage is detected and a corresponding output developed for magnetic amplifier 89.

Magnetic amplifier 89 is essentially a pair of saturable reactors 91 and 93. Each reactor has a primary winding 95, a secondary winding 97, and a control winding 99: control windings 99 are connected to the plate circuits of the discriminator and are energized by its output; primary windings 95 are connected in series and are energized by alternating current sources S; and secondary windings 97 are connected in series opposition with respect to each other and in parallel with the variable phase winding 119 of elevator servomotor 103 and the variable phase winding 41 of pitch synchronizer motor 37.

When the automatic pilot is not engaged with the control surfaces, switch 101 is closed and the output signal of secondary windings 97 energizes the variable phase winding 41 of motor 37 of pitch synchronizer 31. When the automatic pilot system is engaged with the control surfaces, switch 101 is open and the output signal from secondary windings 97 is conducted to the variable phase winding 119 of servomotor 103, whose fixed phase winding 117 is constantly energized. This servomotor transforms the electrical signal into mechanical motion, correspondingly displacing elevator surface 109 by way of suitable gearing 105 and a manually operated clutch 107.

Clutch 107 may be incorporated in a device such as shown in application Serial No. 138,423, now Patent No. 2,663,519, filed January 13, 1950 by F. H. S. Rossire and assigned to the assignee of the present invention. A manually engaging handle 111, connected by suitable means to clutch 107, engages and disengages the clutch. When clutch 107 is disengaged, the elevators may be operated independently of the automatic pilot by manipulating a conventional control column 113 which is connected through cables 115 to the elevators.

The foregoing completes the displacement signal chain. Considering now the rate signal chain, signals from rate generator 121, follow-up device 123, pitch rate gyro 124, the novel "up-elevator" device 56, and the altitude device 54 are combined algebraically. The combined signal is passed through the rate filter circuit 167 and impressed on the grid of isolation tube 201 whose output is added algebraically at mixing transformer 75 to the above described displacement signal chain.

Rate generator 121 provides a damping signal proportional to the speed of rotation of the servomotor. It may be of a conventional type, having a rotor which is driven through a gear train by servomotor 103, one winding 125 which is energized by an alternating current source, and another winding 127 in which the signal corresponding to the speed of rotation of motor 103 develops.

Follow-up 123 may be a conventional inductive device having an energized rotor winding 129 inductively coupled with a stator winding 131. Rotor winding 129 is displaced from its null position relative to stator 131 as the elevator surface is moved. So that the null position of inductive device 103 will normally coincide with the streamlined position of the elevator surface, rotor 129 is connected with the elevator surface at all times; i.e., when the elevator surface is connected by clutch 107 to servomotor 103 for operation by the automatic pilot and when the surface is disconnected from the automatic pilot and placed under the direct manual control of lever 113. A potentiometer 133 connects stator winding 131 of follow-up device 123 and winding 127 of rate generator 121 in series.

Pitch rate gyroscope 124 through an inductive device 137 provides damping signals for the attitude control of the craft. This gyroscope may be of a conventional type having its rotor spinning preferably in a counter-clockwise direction about a normally vertical spin axis AA and its gimbal axis BB positioned parallel to the roll axis of the craft. Movement of the gyroscope about gimbal axis BB displaces an energized rotor winding 139 relative to stator winding 141 to develop a pitch rate signal. This signal is impressed across a potentiometer 143.

A potentiometer 159 across a secondary winding of the novel "up-elevator" device 56 of the present invention provides an "up-elevator" signal for the rate signal chain.

Potentiometer 165 connected across secondary winding 63 of transformer 62 of altitude device 54 provides a signal corresponding to the displacement of the craft from a desired altitude so that a signal corresponding to the rate of change of altitude is derived from this displacement signal in rate filter circuit 167.

Filter circuit 167 may be of the type described in application Serial No. 90,236, now Patent No. 2,754,418, filed April 28, 1949 by A Bennett and J. C. Owen and assigned to the assignee of the present invention. This filter attenuates persistent signals of relatively low frequencies, passes high frequency signals unattenuated, and derives an altitude rate signal from the altitude displacement signal.

After the reference signals are applied to a ptentiometer 169 and have been adjusted to a suitable level by tap 173, the signal is given a stage of amplification in preamplifier 175. A discriminator 177 receiving the signal output of amplifier 175 discriminates the phase of the signal and develops a corresponding output for thermal time delay device 179.

Thermal time delay device 179 may be of the type described in U.S. Patent No. 2,463,805 issued May 8, 1949 to Polye et al. Such a device is made of two identical sections enclosed in an evacuated glass envelope. Each section has a heater winding surrounded by a quartz glass insulator around which a resistance winding is placed. A potentiometer is connected across the external ends of the resistance winding and adjusted to form a balanced bridge.

In the embodiment herein, heaters 181 and 183 of delay device 179 are connected in the plate circuits of discriminator 177. Resistors 185 and 187 are connected by potentiometer 189 to form a normally balanced bridge network. Depending upon the phase of the voltage at discriminator 177, one of the heaters is energized. The resulting heat generated unbalances the bridge. The voltage that appears at the wiper of potentiometer 189 is amplified in two stages 191, 193 and is applied as a feedback voltage to the primary winding 195 of a feedback transformer 197 whose secondary winding 199 is connected across potentiometer 169.

The signals from potentiometer 169 are conducted to the grid of isolation amplifier 201 whose output is impressed upon primary winding 203 of mixing transformer 75. Thus, the signals from the rate filter circuit 167 are added algebraically to the signals from the displacement signal chain, which are impressed across secondary winding 73 of transformer 75, and the summation of these signals is applied to the input of amplifier 77 by way of lead 74.

The aircraft may be controlled manually by the human pilot or it may be controlled automatically by the automatic pilot.

After disengaging clutch 107 by the operation of handle 111, the craft may be controlled manually by manipulating control column 113. Switch 101 is connected to handle 111 so as to be moved to a closed circuit position by the operation of handle 111 to disengage clutch 107, thereby connecting synchronizer motor 37 to the output of amplifier 77. Should an output exist from servoamplifier 77, motor 37 drives the rotor of inductive device 33 to a position to nullify the signal voltages developed by any of the other inductive devices of the system, at which time there is no input to the amplifier and no output is developed by the amplifier.

During the time the human pilot manually controls the craft, pitch synchronizer 37 constantly preconditions the automatic pilot system so that it may take over automatic control of the craft smoothly at any time without undue stress or strain on the airframe. Synchronizer 37 does this by nulling the input to amplifier 77. When the human pilot operates handle 111 to engage clutch 107 to connect the elevator surface for operation by servomotor 103, this places the craft under control of the automatic pilot system and opens switch 101, disconnecting synchronizer motor 37 from the output of amplifier 77. Although the control of the craft changes from manual to automatic, the craft continues to fly in the same attitude it had been flying under manual control.

During the time the automatic pilot system is controlling the aircraft and clutch 53 of altitude control 49 is engaged, the automatic pilot system maintains the craft at a constant altitude despite any changes which may develop in ship's trim due to loading or other causes. For example, should a maladjustment of the null position of follow-up device 123 relative to the streamlined position of elevator surface 109 develop or the elevator surface be displaced from its neutral or trailing position to another position and be maintained steadily in the new position in order to accommodate for an aerodynamic unbalance, inductive follow-up device 123 would develop a persistent signal. By cancelling out this persistent signal, filter circuit 167 automatically trims the craft to accommodate the new craft attitude.

In operation, the above described automatic pilot system will automatically trim the craft should the attitude change because of a change in loading or other cause. A pitch attitude signal corresponding to this change in attitude is developed in inductive device 3 of attitude gyroscope 1. This signal actuates servomotor 103 to displace elevators 109 in a direction to return the craft toward a level flight attitude. As the craft returns toward level flight attitude, the pitch attitude signal decreases; the follow-up signal from inductive device 123 predominates; and being opposite in phase, the follow-up signal operates servomotor 103 in a reverse direction to return the elevators toward their streamlined position. When a balance is again effected between the attitude signal and follow-up signal, the servomotor stops operating. Since the elevators are displaced from streamlined position, the craft continues in a climb or dive attitude. As rate filter circuit 167 cancels out the persistent follow-up signal, the attitude signal further displaces the control surface from streamlined position to return the aircraft to a level flight attitude.

To change the altitude of the craft, stick controller 25 is moved; the pitch signal developed in inductive device 23 actuating servomotor 103 to displace the elevators 109 to cause the craft to climb or dive. The depressing of a button 29 releases a detent lock (not shown) to move the controller from its normally centered position and opens a switch 205 which is in series with solenoid 55 of clutch 53. This releases inductive device 58 from its driving engagement with aneroid 51 and rotor 57 is moved by means of a spring (not shown) to a centered position. When the craft has attained the desired altitude, the controller is manually centered; and as the button on the stick is released, switch 205 closes and clutch 53 again drivably connects rotor 57 of inductive device 58 to aneroid 51. The altitude device then develops signals to maintain the craft at the new altitude.

To return the craft to level flight attitude when the craft is diving or climbing, switch 69 is moved to dotted line position. This disconnects inductive device 25 of the manual controller and inductive device 33 of synchronizer 31 from the circuit; so that the craft is controlled by the automatic pilot system independently of the stick controller and synchronizer.

In accordance with the present invention, a compensation is provided to maintain the craft at a constant altitude during turns by increasing the lift by changing the angle of attack of the aircraft through the action of the elevator surfaces.

To sense the turning of the aircraft, an inductive device 147 has its rotor winding 149 connected for displacement relative to stator winding 151 by movement of gyroscope 1 during a banking of the craft to develop a roll attitude signal. A displacement of rotor 149 from its null position in a counterclockwise direction develops a signal of one phase and a displacement in a clockwise direction develops a signal whose phase is one hundred eighty degrees displaced from the phase of the first signal. The output of novel "up-elevator" system 56, however, is always of the same phase although the input from stator winding 151 is reversible in phase.

The novel "up-elevator" device 56 of the present invention is comprised generally of a preamplifier 211, a discriminator 212, a thermal device 213, and a post amplifier 214.

The bank signal from inductive device 147 is applied to amplifier 211, and its output is applied to a common lead 218 which connects the grids of discriminator 212. The plates of the discriminator receive their excitation from the opposite ends of the secondary winding 215 of a transformer 217 whose primary winding is energized by an alternating current source. Inasmuch as the signal on both grids is always of the same phase at any instant while the excitation on each plate is always opposite in phase, only one plate will conduct because only one plate and control grid will be in phase with each other.

Since the phase relationship between the plates and the signal on the control grids determines whether the upper or lower plate of the discriminator will conduct, and the phase of the signal on the control grids depends upon the phase of the signal from bank take-off 147, then one plate will conduct for a turn to the left and the other plate for a turn to the right. Thus, the discriminator provides a means for determining whether the turn is to the left or right. Potentiometers 231 and 232 permit the adjustment of the signal to the proper level to provide the correct "up-elevator" action for a turn in either direction.

To form a complete circuit for discriminator 212, a lead 234 connects the center tap of the secondary winding 215 to one end of a heater 235 of a thermal time delay device 213 and a lead 237 connects the other end of the heater 235 to the cathodes of discriminator 212.

The thermal responsive device 213 may be similar to the device disclosed in the aforementioned U.S. Patent No. 2,463,805, heater 235 being in heat exchange relation with a resistor 240. One end of resistor 240 is grounded by lead 245 and connects through a resistor 246 with a variable tapped resistor 247. This resistive network presents a normally balanced Wheatstone bridge; one arm being resistor 240, another arm resistor 246, a third arm the portion of resistor 247 above tap 248, and the fourth arm the portion of resistor 247 below tap 248. Bridge energy is supplied across a diagonal formed by junctions 261 and 262, and the bridge output, which is null when the bridge is balanced, is taken from tap 248.

Because heater 235 is connected to the cathodes of discriminator 212 and to the center tap of secondary winding 215, current will flow in heater 235 whenever either plate of the discriminator conducts, causing a change in temperature in heater 235. The heating of resistor 240 in heat exchange relationship with the heater unbalances the normally balanced bridge network, the unbalance being proportional to the heat imparted to the heater. Since the same resistor is heated for left and right turns, the bridge output at tap 248 will always be of the same phase.

The bridge output from tap 248 is given a stage of amplification by amplifier 214 and impressed by way of coupling transformer 250 across two potentiometers 68 and 159; potentiometer 68 being connected in the displacement signal chain and potentiometer 159 in the rate signal chain. The signal from potentiometer 68 actuates servomotor 103 to displace the elevators to a position such that the angle of attack is increased to maintain the craft at a level attitude. The signal from potentiometer 159 opposes the adverse signal from the pitch rate potentiometer 143. This adverse signal results from the component of the rate of turn about the vertical to which the rate gyro 124 responds and opposes the upward displacement of the elevators. Connecting potentiometer 159 in the rate signal chain permits the "up-elevator" signal to cancel the adverse signal and eliminates the need for the adverse signal to be cancelled out by rate filter circuit 167, thereby improving the operation of the system.

The foregoing has presented a novel "up-elevator" device which compensates for the tendency of an aircraft to lose vertical lift as it makes a turn and keeps the aircraft at the desired altitude. Adjustments may be made in the novel "up-elevator" device to compensate for any difference in loss which the craft may experience for right and left turns. Further, a portion of the signal from the novel "up-elevator" device directly actuates the servomotor for the surface while another portion acts in opposition to adverse signals from other master instruments. Also the heat exchange in the thermal device 213 may be made such that small turns do not appreciably affect the elevators unless such turns are sustained.

Although only a single embodiment of the present invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

We claim:

1. In an automatic steering system for an aircraft having pitch and roll axes, a servomotor adapted to displace said craft about the pitch axis, reference means for developing a signal whose amplitude corresponds to the amount of displacement of an aircraft about its roll axis and whose phase corresponds to the direction of displacement, a phase discriminator operably connected with said reference device for receiving said reference signal and developing a corresponding output, means operatively connected with said discriminator for adjusting the relationship between the reference signal and said output for each phase of said reference signal, a normally balanced Wheatstone bridge having an output when unbalanced, one leg of said bridge being comprised of a conductive element possessing a high temperature coefficient of resistance, heat generating means in heat exchange relationship with said conductive element, means operably connecting said heat generating means and said discriminator means for energizing said heating means by said discriminator output to unbalance said bridge, and means operably connecting said servomotor and said bridge for operating said servomotor by said bridge output.

2. An automatic system for controlling the lift of an aircraft during turning, comprising position reference means having two output circuits, said reference means providing a bank signal corresponding to the displacement of the aircraft about the bank axis to the first of said output circuits and providing a pitch signal corresponding to the displacement of said aircraft about the pitch axis to the second of said output circuits, a servo mechanism for controlling said aircraft about its pitch axis, said first output circuit including a normally balanced bridge network for developing a bridge signal when unbalanced and having a leg responsive to changes in temperature by changes in resistance, heat generating means in heat exchange relationship with said leg and connected with said first circuit so as to be operable in response to said bank signal to unbalance said bridge network, means operably connecting said bridge network and said second output circuit to said servomotor for operating the latter by said pitch signal and the signal from said bridge network.

3. In a device for developing an electric signal of fixed phase from an electric signal of reversible phase, means for receiving said signal of reversible phase and developing an output signal corresponding thereto, means associated with said first named means for individually adjusting said output signal for each phase of the received signal, a normally balanced resistive Wheatstone bridge network for developing a bridge signal when unbalanced, means operably connecting said output signal to a leg of said bridge for varying the resistance value of said leg by an amount corresponding to said input signal to unbalance said bridge, whereby the bridge signal is of one phase regardless of the phase of said signal of reversible phase.

4. In a device for developing a signal of fixed phase from a signal of variable phase, a discriminator for detecting the phase of said signal and developing an output corresponding to said signal, means operably connected with said discriminator for adjusting the relative output of the discriminator for each phase, a normally balanced bridge network for developing a bridge output when unbalanced, means operably connected with said bridge and said discriminator for unbalancing said bridge in one direction by varying the resistance value of a leg of said bridge by an amount corresponding to said discriminator output.

5. In a device for developing an output voltage of fixed phase from an input voltage of reversible phase, an input for receiving said input voltage, a discriminator operably connected with said input for detecting the phase of said input voltage, means operably connected with said discriminator for adjusting the relative voltage level for each phase of said input, whereby said discriminator has an output corresponding to the adjusted input, a normally balanced Wheatstone bridge having a leg responsive to changes in temperature by change in resistance value and having an output when unbalanced, heat generating means thermally connected with said leg, means operably connecting said discriminator output with said heat generating means for varying the temperature of said bridge leg in accordance with said discriminator output, whereby the bridge is unbalanced in the same direction by the change in resistance of said leg due to said change in temperature to develop a bridge output of fixed phase for said input voltage of reversible phase.

6. An up-elevator circuit for the automatic steering system of an aircraft, reference means for developing an electrical signal corresponding to displacement of the aircraft about the bank axis, a normally balanced electrical circuit arranged to provide an output of fixed phase when unbalanced and having a conductive element therein possessing a high temperature coefficient of resistance, heat generating means arranged in heat exchange relationship with said conductive element, means connecting said normally balanced electrical circuit and said reference means for energizing said heat generating means to vary the value of the resistance of said conductive element to unbalance said normally balanced circuit, a servomotor adapted for displacing the elevators of an aircraft, means connecting said servomotor and said normally balanced circuit for operating said servomotor so as to displace the elevators an amount corresponding to the unbalance of said electrical circuit.

7. In an automatic steering system for an aircraft, said aircraft having roll and pitch axes and a control surface movable with respect to said craft for controlling the latter about its pitch axis, servomotor means connected with said surface for moving the latter, reference means on said craft for generating an electric signal in response to departure of the craft from a predetermined position relative to its roll axis, and means operably connecting said reference means to said servomotor for moving said elevators in one direction upon said departure of the craft from its roll axis, said last named means including a normally balanced bridge circuit having a conductive element of one leg possessing a high temperature coefficient of resistance, heat generating means in heat exchange relationship with said conductive element and connected to be energized by said electric signal so that the resistance of said conductive element is varied to unbalance said bridge and develop an electric signal, and means associated with said bridge circuit and said servomotor for operating said servomotor by said last mentioned signal.

8. An automatic steering system for an aircraft having pitch and roll axes, comprising actuating means for displacing said craft about its pitch axis, means for producing a reference signal of reversible phase having an amplitude corresponding to the extent of angular deviation of the craft about its roll axis and a phase corresponding to the direction of displacement, means receiving the reference signal for modifying the amplitude of the reference signal according to its phase to provide an adjusted signal having a magnitude dependent upon the direction of displacement of the craft about its roll axis, a circuit element connected with the signal modifying means and producing a response dependent upon the magnitude of the adjusted signal and independent of its phase, a normally balanced bridge network including the circuit element and having its balance controlled by said circuit element and arranged to provide an output signal of fixed phase when unbalanced, and means operably connecting the bridge network and said actuating means for displacing the craft about said pitch axis an amount corresponding to the bridge unbalance.

9. An automatic steering system for an aircraft having pitch and roll axes, comprising actuating means for displacing said craft about its pitch axis, means for producing a reference signal of reversible phase having an amplitude corresponding to the extent of angular deviation of the craft about its roll axis and a phase corresponding to the direction of displacement, means operably connected to the signal producing means including a circuit element energized by a signal of magnitude and phase depending upon said reference signal, said circuit element producing a response depending upon the magnitude of its energizing signal and independent of its phase, a normally balanced bridge network having its balance controlled by said circuit element and arranged to provide an output signal of fixed phase when unbalanced, and means operably connecting the bridge and said actuating means for displacing the craft about said pitch axis an amount corresponding to the bridge unbalance.

10. In an aircraft control system, power means for controlling the pitch attitude of the craft, a rate gyro for developing a control signal corresponding to rate of turn of the craft about its pitch axis and developing an adverse signal corresponding to the rate of turn of the craft about a vertical axis, means responsive to banking of the craft for developing two signals of fixed phase, and means for summing all of the signals and applying the signal sum to the power means for changing the pitch attitude of the craft, said summing means combining one of the fixed phase signals and the adverse signal in opposition to one another and applying the other fixed phase signal to the power means in a sense to increase the angle of attack of the craft.

References Cited in the file of this patent

UNITED STATES PATENTS

| | | |
|---|---|---|
| 2,432,036 | Noxon | Dec. 2, 1947 |
| 2,463,805 | Polye et al. | Mar. 8, 1949 |
| 2,531,188 | Yates | Nov. 21, 1950 |
| 2,575,890 | Perkins | Nov. 20, 1951 |
| 2,585,162 | Noxon | Feb. 12, 1952 |
| 2,592,173 | Noxon | Apr. 8, 1952 |
| 2,643,354 | MacCallum | June 23, 1953 |
| 2,656,134 | Hanna et al. | Oct. 20, 1953 |
| 2,665,861 | MacCallum | Jan. 12, 1954 |